June 3, 1930.   M. A. CAMPBELL   1,762,127
SEAT BACK SUPPORT AND ADJUSTER
Filed Jan. 3, 1928
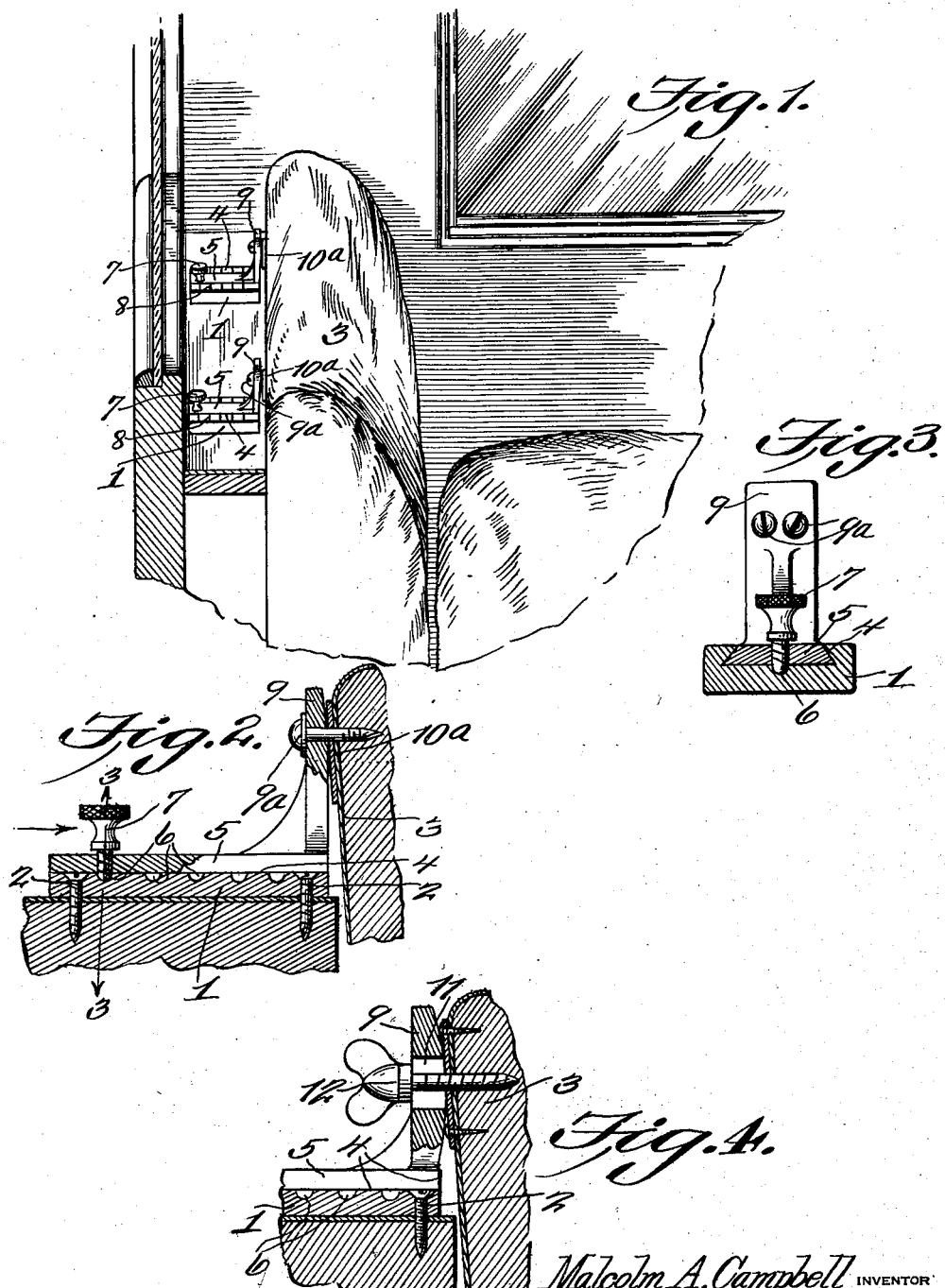
Malcolm A. Campbell INVENTOR
ATTORNEY Patented June 3, 1930

1,762,127

UNITED STATES PATENT OFFICE

MALCOLM ALEXANDER CAMPBELL, OF CHICAGO, ILLINOIS, ASSIGNOR OF ONE-THIRD TO BERNARD HEEREY AND ONE-THIRD TO FRANK M. UTT, BOTH OF CHICAGO, ILLINOIS

SEAT-BACK SUPPORT AND ADJUSTER

Application filed January 3, 1928. Serial No. 244,205.

The present invention relates to an improved seat back support and adjuster, and the purpose thereof is to proved a device of this kind which will enable the back of a seat, particularly that of an automobile, to be adjusted in order to regulate its position and more comfortably accommodate the body of the chauffeur or driver and hence avoid rendering the handling of the steering wheel tiresome.

It is well known that in all coupé automobiles there is a ledge or shelf at the upper rear portion of the seat back, it being customary in the construction of the automobile to fix this seat back to the ledge, hence it is the purpose of the present invention to avoid the use of this securing means and to mount the seat back so that it can be adjusted.

In order to carry out this scheme, a further purpose is to provide a combined support and adjuster mounted on the ledge, including a slide which may abut the upper portion of the seat back, there being means to hold the slide in different adjusted positions, especially to hold the upper portion of the seat back forwardly, in order to more comfortably accommodate the position of the driver's back with relation to the steering wheel, and hence avoiding being tiresome when manipulating the automobile steering wheel.

Still another purpose is to provide a supporter and adjuster of this kind, which may have a loose or abutting connection with the seat back, in order to accommodate the different positions of the seat back.

It is to be understood that the particulars herein given are in no way limitive, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:

Figure 1—is a view showing the application of the improved supporter and adjuster as applied to the back of the coupé seat.

Figure 2—is a longitudinal sectional view through the same.

Figure 3—is a transverse sectional view on line 3—3 of Figure 2.

Figure 4—is a view more clearly showing the abutting connection between the slide and the seat back, wherein a modified construction is employed.

Referring to the drawings 1 identifies the base of the seat back support and adjuster, which may be fastened at 2 by any suitable means to the ledge or shelf at the rear of the seat back 3. This base has a longitudinal guide 4 of a dovetail character, though not necessarily, for any form of guide may be used. Mounted in the guide is a slide 5 which is also of a dovetail contour to enter and operate in the guide.

The bottom of the guide is provided with a plurality of depressions 6 of spherical shape to receive the end of a holding screw 7, so as to hold the slide in different positions. There is a plurality of these depressions, and any one of them may be used, and they are arranged to correspond with a plurality of transverse cuts or indicators 8 formed upon opposite portions of the top of the base in order to indicate the position the slide assumes.

The forward portion of the slide has an upstanding arm 9, which may be either straight, or it may be partly curved, and if straight it has a pivotal connection at 10 to the seat back, and if curved it may have a slot 11 to receive a thumb screw 12 which penetrates the seat back, so that by moving the slide in different positions, the seat back may be held in different positions to more comfortably accommodate the posture of the body of the driver.

This thumb screw retains the seat back in place when the screw is tightened in order to outstand any pull which may be exerted on the seat back when the driver may be entering the automobile.

Referring to Figures 1, 2 and 3 it is to be noted that the upstanding arm 9 is connected by two screws 9ᵃ to the seat back, there being a wear plate 10ª between the arm 9 and the seat back. It is to be noted that the face of the arm 9 where it engages with the wear plate is very slightly angled so as to permit of any variations of the parts in changing the position of the seat back.

In Figure 6 the upstanding arm 9 is connected to the seat back in the manner previously set forth.

The invention having been set forth, what is claimed is:

1. In a seat back support and adjuster, the combination with a base to be secured to the ledge of an automobile seat back, said base having a guide, a slide operatively mounted in the guide, means for retaining the slide in different positions, said slide at its forward end having an upstanding arm provided with a loose operative abutting connection with the seat back to hold it in different positions, said loose operative abutting connection including a slot in the upstanding arm and means passing through the slot and penetrating the seat back for insuring said connections.

2. In an automobile seat back support and adjuster the combination with a base to be fastened on the ledge to the rear of the seat back, of a slide operatively guided upon the base with means for holding it in different adjusted positions, the forward end of the slide having an upstanding arm and being curved to accommodate itself to the seat back, said arm having a slot, and a thumb screw passing through the slot and penetrating the seat back for the purpose of loosening or tightening the connections with the seat back.

3. In a seat back and adjuster, the combination with a base to be secured to the ledge of an automobile seat back, said base having a guide comprising a channel and adjoining overhanging flanges, of a slide mounted in the guide and having opposite longitudinal edges fitting between said overhanging side flanges, the bottom of the guide having depressions, means adjustably penetrating through the slide and adapted to engage any one of said depressions to hold the slide in different positions, said slide at its forward end having an upstanding arm provided with loose operative abutting connections with the seat back, permitting slight variation in angular relation of the back with regard to the arm, said upstanding arm where it has loose abutting connections with the seat back being shaped to permit of a rocking engagement between the seat back and the arm.

In witness whereof, the inventor's signature is hereunto affixed.

MALCOLM ALEXANDER CAMPBELL.